United States Patent
Takahashi et al.

(10) Patent No.: US 11,323,311 B2
(45) Date of Patent: May 3, 2022

(54) RADIO COMMUNICATION SYSTEM AND RADIO BASE STATION

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 49 days.

(21) Appl. No.: 16/763,476

(22) PCT Filed: Nov. 15, 2017

(86) PCT No.: PCT/JP2017/041118
§ 371 (c)(1),
(2) Date: May 12, 2020

(87) PCT Pub. No.: WO2019/097610
PCT Pub. Date: May 23, 2019

(65) Prior Publication Data
US 2020/0336364 A1    Oct. 22, 2020

(51) Int. Cl.
*H04L 12/24*    (2006.01)
*H04L 41/0654*    (2022.01)
(Continued)

(52) U.S. Cl.
CPC ......... *H04L 41/0672* (2013.01); *H04W 76/18* (2018.02); *H04W 76/19* (2018.02); *H04W 76/30* (2018.02); *H04W 88/06* (2013.01)

(58) Field of Classification Search
None
See application file for complete search history.

(56) References Cited

U.S. PATENT DOCUMENTS

2015/0173120 A1*  6/2015  Yamada ............ H04W 76/11
                                                     370/331
2015/0215965 A1*  7/2015  Yamada ............ H04W 36/0069
                                                     370/329
(Continued)

FOREIGN PATENT DOCUMENTS

EP      3606223 A1      2/2020
WO   2019/031505 A1   2/2019

OTHER PUBLICATIONS

Extended European Search Report issued in counterpart European Patent Application No. 17931920.7, dated Jun. 7, 2021 (7 pages).
(Continued)

*Primary Examiner* — Alex Skripnikov
(74) *Attorney, Agent, or Firm* — Osha Bergman Watanabe & Burton LLP

(57) ABSTRACT

Upon receiving, from UE (200), SCG Failure Information that indicates that a radio link failure has occurred in a secondary cell group, eNB (100A) transmits, to gNB (100B), Secondary Node Modification Request to instruct to release a resource of a split bearer of only a predetermined layer and the layers below thereof in the secondary cell group. Based on the received Secondary Node Modification Request, the gNB (100B) releases the resource of the split bearer below the predetermined layer in the secondary cell group. The eNB (100A) deletes setting itself of the secondary cell group when a bearer belonging to the secondary cell group other than the split bearer is not set.

7 Claims, 14 Drawing Sheets

(51) Int. Cl.
- *H04W 76/19* (2018.01)
- *H04W 76/18* (2018.01)
- *H04W 76/30* (2018.01)
- *H04W 88/06* (2009.01)

(56) References Cited

U.S. PATENT DOCUMENTS

| | | | |
|---|---|---|---|
| 2016/0212753 A1* | 7/2016 | Wu | H04W 72/085 |
| 2016/0219604 A1* | 7/2016 | Fujishiro | H04W 36/04 |
| 2017/0222876 A1* | 8/2017 | Van Der Velde | H04W 36/0055 |
| 2020/0260494 A1 | 8/2020 | Takahashi et al. | |

OTHER PUBLICATIONS

International Search Report issued in Application No. PCT/JP2017/041118, dated Jan. 30, 2018 (3 pages).

Written Opinion issued in International Application No. PCT/JP2017/041118, dated Jan. 30, 2018 (3 pages).

3GPP TR 38.804 V14.0.0, Release 14; "3rd Generation Partnership Project; Technical Specification Group Radio Access Network; Study on New Radio Access Technology; Radio Interface Protocol Aspects;" Mar. 2017; Sophia Antipolis Valbonne, France (57 pages).

3GPP TSG-RAN WG2 Meeting #99; R2-1709658; "Discussion on S-RLF;" NTT DOCOMO, Inc.; Aug. 21-25, 2017 Berlin, Germany (3 pages).

3GPP TSG-RAN WG2 #99; R2-1708016; "UE behaviour in case of SCG RLF when SCG is the configured path;" Ericsson; Aug. 21-25, 2017; Berlin, Germany (3 pages).

Office Action in counterpart Japanese Patent Application No. 2019-554098 dated Nov. 9, 2021 (6 pages).

NEC; "SCG failure indication from MN to SN"; 3GPP TSG-RAN WG2 NR Ad-Hoc #2, R2-1707377; Qingdao, China; Jun. 27-29, 2017 (4 pages).

Intel Corporation; "Other Control plane aspects of Unified bearers"; 3GPP TSG-RAN WG2 Meeting #99, R2-1708833 Berlin, Germany; Aug. 21-25, 2017 (2 pages).

Samsung; "Report on [86#28][LTE/DC] RRC Procedure and PDU specification (Samsung)"; 3GPP TSG-RAN2#87 meeting, R2-143451; Dresden, Germany; Aug. 18-22, 2014 (12 pages).

* cited by examiner

RADIO COMMUNICATION SYSTEM AND RADIO BASE STATION

TECHNICAL FIELD

The present invention relates to a radio communication system and a radio base station capable of setting a split bearer.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

Specifically, in Non-Patent Document 1, as a type of bearer adapted to dual connectivity (DC) using a radio base station of the LTE system and a radio base station of the NR system, a split bearer that passes via a secondary cell group (SCG) (Split bearer via SCG) has been defined.

In the Split bearer via SCG, when the master base station is a radio base station of the LTE system (hereinafter, "LTE MeNB") and the secondary base station is a radio base station of the NR system (hereinafter, "NR SgNB" or simply "SgNB"), a bearer for a user plane (S1-U) between the core network and the radio base station is set only between the core network (EPC (Evolved Packet Core)) and the NR SgNB. This bearer is branched to the LTE MeNB in the PDCP layer of the NR SgNB and constitutes a split bearer.

User data (for example, downlink data) is transmitted from the LTE MeNB and the NR SgNB to a user equipment (UE) via this split bearer. As a result, the dual connectivity that uses the LTE MeNB and the NR SgNB is realized.

PRIOR ART DOCUMENT

Non-Patent Document

Non-Patent Document 1: 3GPP TR 38.804 V14.0.0 Section 5.2.1.2 Bearer types for Dual Connectivity between LTE and NR, 3rd Generation Partnership Project; Technical Specification Group Radio Access Network; Study on New Radio Access Technology; Radio Interface Protocol Aspects Release 14), 3GPP, March 2017

SUMMARY OF THE INVENTION

As explained above, when the secondary base station is the radio base station of the NR system (NR SgNB), a case is prescribed in Non-Patent Document 1 in which the LTE MeNB forms a macro cell and the NR SgNB forms a small cell.

In this case, when the UE moves, it is expected that the UE frequently goes outside the coverage area of the small cell. Therefore, when the split bearer that passes via the SCG has been set, it is necessary to release the split bearer and re-set a new bearer that passes via only the master cell group (MCG).

Furthermore, after releasing the split bearer, if the UE moves in the coverage area of the small cell, it is expected that a new split bearer is set and the dual connectivity is restarted. In other words, there is concern that the signaling amount associated with such release and setting of the split bearer increases.

On the other hand, if the SCG is maintained despite the occurrence of a radio link failure (RLF), the active state of the PSCell and SCell, that is, the connected state (RRC Connected state) in the radio resource control layer (RRC layer) is maintained. For this reason, the UE unnecessarily performs quality measurement and reporting which increases the power consumption.

The present invention has been made in view of the above discussion. One object of the present invention is to provide a radio communication system and a radio base station that can, when setting a split bearer that passes via the secondary cell group (SCG), simultaneously achieve both the suppressing of the increase of the signaling amount due to repeated release and setting of a split bearer and reduction of the power consumption of the user equipment.

A radio communication system according to one aspect of the present invention is a radio communication system (radio communication system 10) in which a split bearer (split bearer $B_{SP}$) that passes from a core network (core network 20) to a secondary cell group (SCG) and branches from other radio base station (for example, gNB 100B) included in the secondary cell group to a radio base station (for example, eNB 100A) included in a master cell group (MCG) is set, and in which data is transmitted to a user equipment (UE 200) via thus set split bearer. The radio base station includes a failure notification receiving unit (failure notification receiving unit 130) that receives from the user equipment a failure notification (SCG Failure Information) that indicates that a radio link failure (S-RLF) has occurred in the secondary cell group; and a connection control unit (connection control unit 120) that, when the failure notification receiving unit has received the failure notification, transmits to the other radio base station a resource change request (Secondary Node Modification Request) to instruct to release the resource of the split bearer of a predetermined layer (for example, RLC layer) and the layers below thereof in the secondary cell group. The other radio base station includes a resource control unit (resource control unit 140) that releases the resource of the split bearer of the predetermined layer and the layers below thereof in the secondary cell group based on the received resource change request. The connection control unit deletes setting itself of the secondary cell group when a bearer belonging to the secondary cell group other than the split bearer is not set.

A radio base station according to another aspect of the present invention is a radio base station in which a split bearer that passes from a core network to a secondary cell group and branches from other radio base station included in the secondary cell group to the radio base station included in a master cell group is set, and that transmits data to a user equipment via thus set split bearer. The radio base station includes a failure notification receiving unit that receives from the user equipment a failure notification that indicates that a radio link failure has occurred in the secondary cell group; and a connection control unit that, when the failure notification receiving unit has received the failure notification, transmits to the other radio base station a resource change request to instruct to release the resource of the split bearer of a predetermined layer and the layers below thereof in the secondary cell group. The connection control unit deletes setting itself of the secondary cell group when a bearer belonging to the secondary cell group other than the split bearer is not set.

MODES FOR CARRYING OUT THE INVENTION

Figure 1:
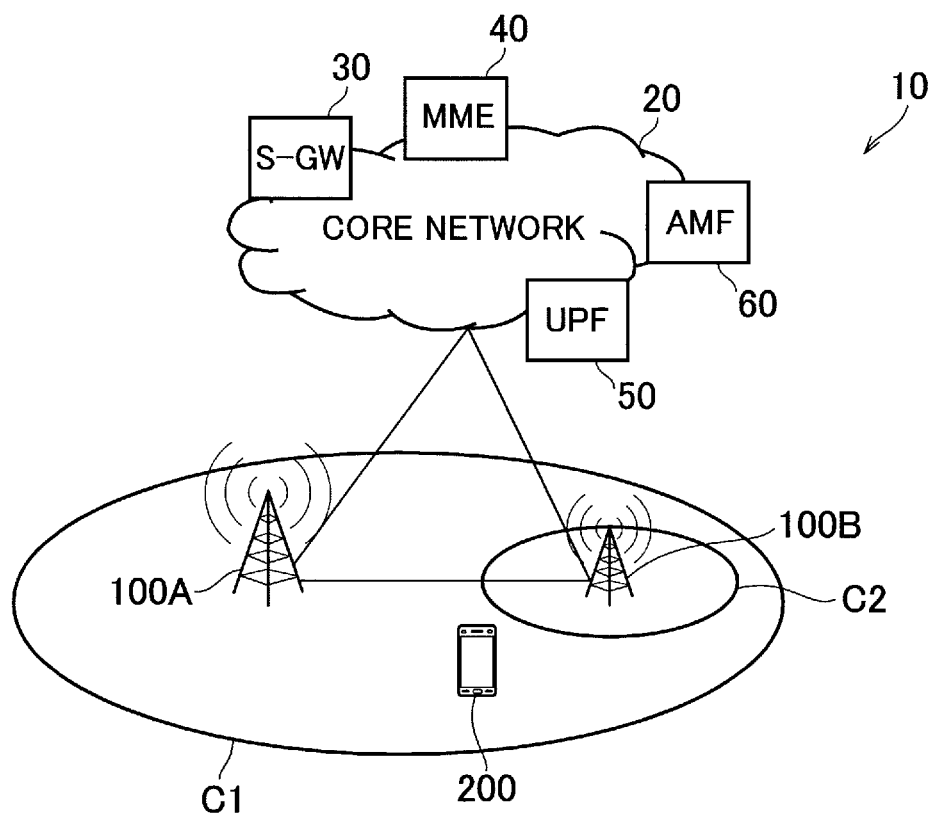
FIG. 1 is an overall schematic configuration diagram of a radio communication system 10.

Exemplary embodiments will be described below with reference to the drawings. Note that the same or similar reference numerals are attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to Long Term Evolution (LTE) and 5G New Radio (NR). The radio communication system 10 includes a core network 20 and a user equipment 200 (hereinafter, "UE 200"). A radio base station 100A (hereinafter, "eNB 100A") and a radio base station 100B (hereinafter, "gNB 100B") are connected to the core network 20.

The core network 20 can be a core network of the LTE system (EPC (Evolved Packet Core)) or a core network of the NR system (NextGen Core, 5GC).

The core network 20 is connected to Serving Gateway 30 (hereinafter, "S-GW 30") and Mobility Management Entity 40 (hereinafter, "MME 40") that are nodes (devices) of the LTE system. Also, User Plane Function 50 (hereinafter, "UPF 50") and Access and Mobility Management Function 60 (hereinafter, "AMF 60") that are nodes (devices) of the NR system are connected to the core network 20.

In the present embodiment, the eNB 100A is a radio base station (eNB) of the LTE system and the eNB 100A can constitute a master base station. Hereinafter, the eNB 100A may be expressed as LTE MeNB (or simply MeNB) as appropriate. The gNB 100B is a radio base station (gNB) of the NR system and the gNB 100B can constitute a secondary base station. Hereinafter, the gNB 100B may be expressed as NR SgNB (or simply SgNB) as appropriate.

The eNB 100A forms a cell C1. The gNB 100B forms a cell C2. In the present embodiment, the cell C1 is a macro cell and the cell C2 is a small cell. That is, the cell C2 is smaller than the cell C1. Note that there can be more than one cell C1 and more than one cell C2.

The cell C1 formed by the eNB 100A constitutes a master cell group (MCG). A secondary cell group (SCG) is configured by the cell C2 formed by the gNB 100B.

Figure 2:
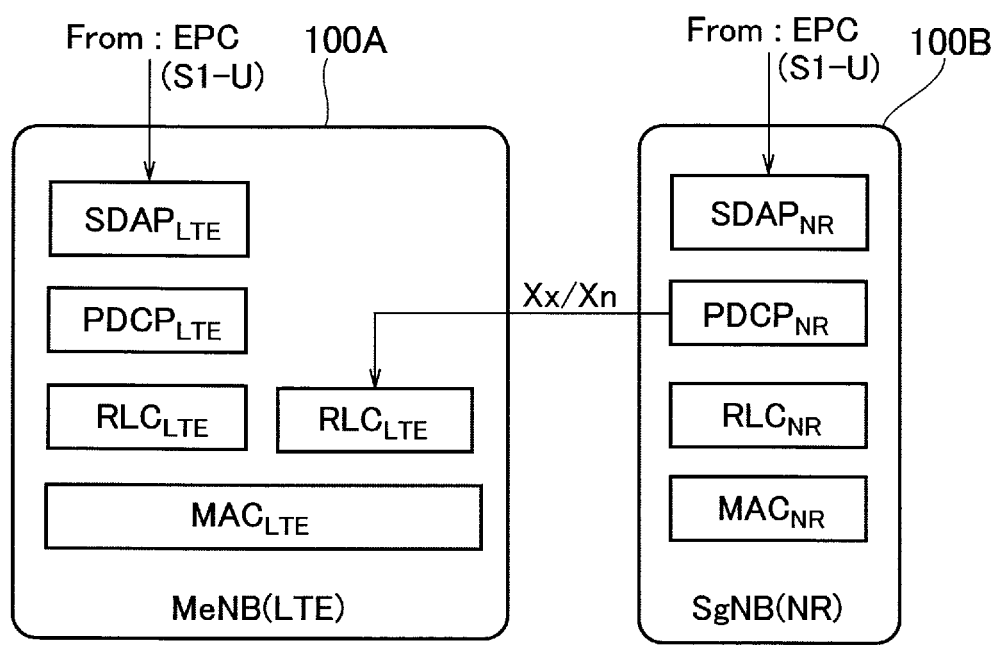
FIG. 2 is a diagram showing a protocol stack of eNB 100A (LTE MeNB) and gNB 100B (NR SgNB).

FIG. 2 shows a protocol stack of the eNB 100A (LTE MeNB) and the gNB 100B (NR SgNB). As shown in FIG. 2, the eNB 100A includes MAC (Medium Access Control) layer ($MAC_{LTE}$), RLC (Radio Link Control) layer ($RLC_{LTE}$), PDCP (Packet Data Convergence Protocol) layer ($PDCP_{LTE}$), and AS (Access Stratum) sublayer, specifically, Service Data Application Protocol layer ($SDAP_{LTE}$).

Similarly, the gNB 100B also includes MAC (Medium Access Control) layer ($MAC_{NR}$), RLC (Radio Link Control) layer ($RLC_{NR}$), PDCP (Packet Data Convergence Protocol) layer ($PDCP_{NR}$), and AS (Access Stratum) sublayer, specifically, Service Data Application Protocol layer ($SDAP_{NR}$). The $SDAP_{NR}$ is necessary when connecting to NextGen Core. When connecting to the EPC, the conventional QoS method is followed.

A control plane (C plane) and a user plane (U plane) are set between the core network 20 (EPC) and the eNB 100A, however, only the U plane is set between the core network 20 (EPC) and the gNB 100B.

Although not shown, each of the eNB 100A and the gNB 100B has a physical layer below the MAC layer. Moreover, the later-explained RRC (Radio Resource Control) such as RRC Connection Reconfiguration is included in the AS sublayer ($SDAP_{LTE}$, $SDAP_{NR}$).

The eNB 100A and the gNB 100B are connected to the core network 20 (EPC) via S1-U interface. The eNB 100A and the gNB 100B are connected to each other via an inter-base station interface (hereinafter, "X interface (Xx/Xn)". In the LTE, the X2 interface is a typical inter-base station interface). As shown in FIG. 2, the eNB 100A has an RLC layer ($RLC_{LTE}$) for the X interface and the eNB 100A is connected to the PDCP layer ($PDCP_{NR}$) of the gNB 100B via this X interface.

In the present embodiment, a split bearer $B_{SP}$ (not-shown in FIG. 2 but shown in FIG. 6 or the like) that passes to the secondary cell group (SCG) via the core network 20 and then branches from the secondary cell group to the radio base station (eNB 100A) included in the master cell group, specifically, Split bearer via SCG, is set.

Data to be transmitted from the core network 20 to the UE 200, specifically, downlink user data, is transmitted to the UE 200 via the split bearer $B_{SP}$.

(2) Functional Block Configuration of Radio Communication System

A functional block configuration of the radio communication system 10 will be explained below. Specifically, a functional block configuration of the eNB 100A and the UE 200 will be explained.

(2.1) eNB 100A and gNB 100B

A functional block configuration of the radio communication system 10 will be explained. Specifically, a functional block configuration of the eNB 100A and the UE 200 will be explained.

(2.1) eNB 100A and gNB 100B

Figure 3:
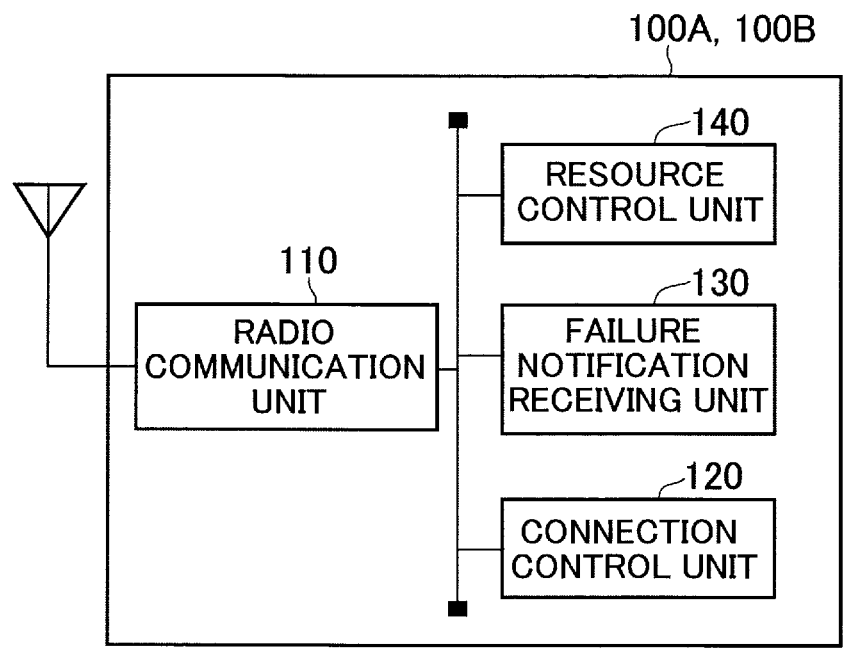
FIG. 3 is a functional block diagram of the eNB 100A and the gNB 100B.

FIG. 3 is a functional block diagram of the eNB 100A and the gNB 100B. Hereinafter, unless otherwise mentioned, the explanation will be given by taking the eNB 100A as an example. As explained above, the gNB 100B is different from the eNB 100A in that it is of the NR system, and in the present embodiment, it constitutes the secondary base station.

As shown in FIG. 3, the eNB 100A includes a radio communication unit 110, a connection control unit 120, a failure notification receiving unit 130, and a resource control unit 140.

The eNB 100A provides the function of each layer in the protocol stack shown in FIG. 2 by the function blocks shown in FIG. 3. In FIG. 3, the function blocks that relate to the present invention are only shown.

The radio communication unit 110 performs radio communication in accordance with the LTE system. Specifically, the radio communication unit 110 transmits to/receives from the UE 200 a radio signal in accordance with the LTE system. The user data, and the control data are multiplexed in the radio signal.

The connection control unit 120 controls a connection between the eNB 100A and the UE 200 and a connection between the eNB 100A and the gNB 100B. Specifically, the connection control unit 120 controls the connection with the UE 200 in the RRC layer. In addition, the connection control unit 120 controls the connection with the gNB 100B via the X interface (Xx/Xn).

Figure 6:
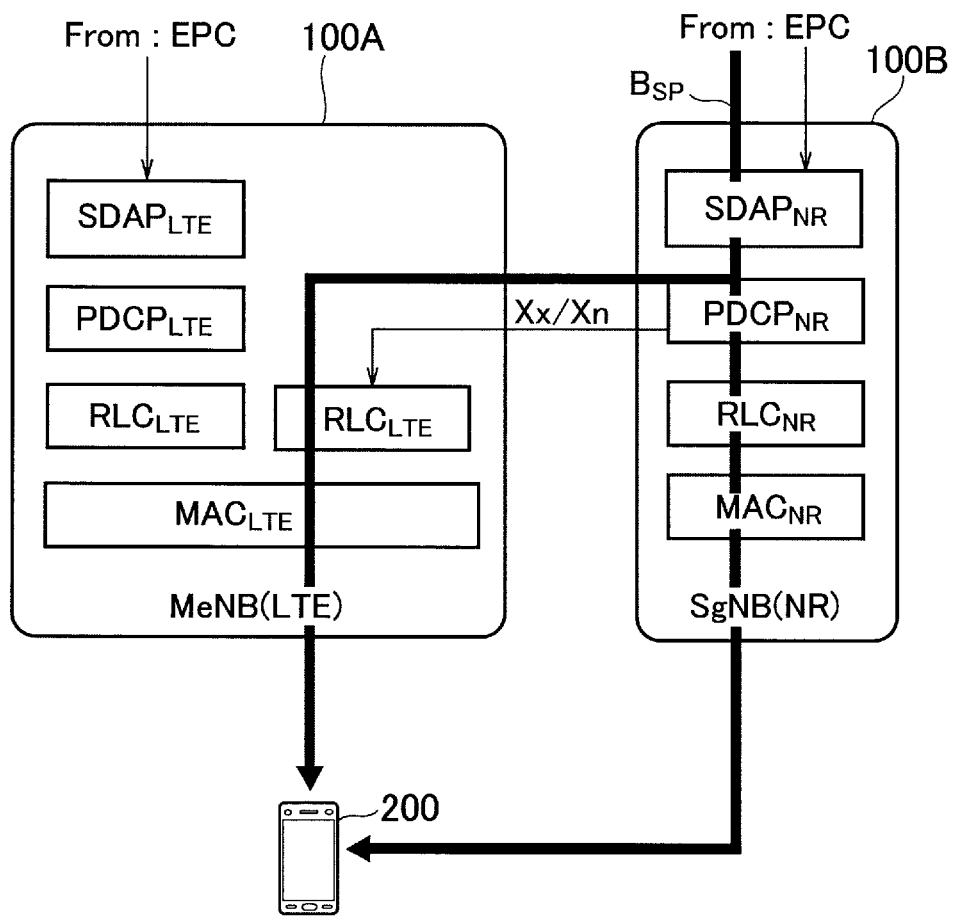
FIG. 6 is a diagram showing a configuration example of a split bearer $B_{SP}$ (Split bearer via SCG).

In particular, in the present embodiment, the connection control unit 120 transmits to the UE 200 a connection message (RRC message) for setting the split bearer $B_{SP}$ (see FIG. 6 or the like). Specifically, the connection control unit 120 can transmit to the UE 200 the RRC Connection Reconfiguration that includes an information element (IE) that permits deactivation (deactivate) of the secondary cell group (SCG) under certain condition.

Here, "to deactivate" means that the resource used for setting the split bearer $B_{SP}$ is maintained without releasing; however, with regard to the operation of the UE 200, it means that no uplink signal of the concerned cell is transmitted and monitoring of the PDCCH is also not performed. The UE 200 performs downlink quality measurement by using a downlink synchronization/reference signal and the like; however, the measurement period of such measurement is longer than when in the RRC Connected state.

The connection control unit 120 sends a resource change request (Secondary Node Modification Request) to the gNB 100B (other radio base station) to instruct to release the resource constituting the split bearer $B_{SP}$ of only a predetermined layer and the layers below thereof in the SCG.

Specifically, when the failure notification receiving unit 130 receives a failure notification (S-RLF), the connection control unit 120 transmits to the gNB 100B the Secondary Node Modification Request that instructs to release the resource of the RLC layer and the layers below thereof, that is, to release the $RLC_{NR}$ and the $MAC_{NR}$ (including the physical layer) of the gNB 100B.

When the resource constituting the split bearer $B_{SP}$ is partially released in this manner, if the UE 200 re-connects to the same SCG (that is, the gNB 100B) as before releasing the resource, the connection control unit 120 (that is, the gNB 100B in the present embodiment) can set a split bearer $B_{SP}$ that reuses the released resource.

On the other hand, when the resource constituting the split bearer $B_{SP}$ is partially released as explained above, but if the UE 200 connects to SCG that is different from the SCG before releasing the resource, the connection control unit 120 (that is, the gNB 100B in the present embodiment) can set a new split bearer $B_{SP}$.

When a bearer belonging to the SCG other than the split bearer $B_{SP}$ is not set, the connection control unit 120 can delete the setting itself of the SCG. Specifically, when the bearer belonging to the SCG other than the split bearer $B_{SP}$ that passes via the SCG (that is, the gNB 100B) is not set, the connection control unit 120 deletes the configuration of the SCG, or deletes information such as parameters and identifiers of the physical layer and the MAC layer of all the cells included in the SCG.

The other bearer belonging to the SCG means a bearer set that passes via a node (radio base station) belonging to the SCG, and SCG bearer, SCG split bearer, or MCG split bearer can be mentioned as the examples thereof.

More specifically, the parameter included in CellGroupConfig, which is a type of the information element (IE) included in the RRC message, is common to the concerned cell group not dependent on the type of bearer, and the connection control unit 120 deletes that parameter. As a result, the setting itself of the SCG is deleted (may be called "released").

The connection control unit 120 can delete the setting of the SCG at the timing of release of the resource constituting the split bearer $B_{SP}$ in the SCG. Note that, instead of deleting the setting of the SCG at the timing of release of the resource, the connection control unit 120 can delete the setting of the SCG at some other timing such as, for example, after receiving RRC Connection Reconfiguration Complete from the UE 200.

Furthermore, the connection control unit 120 can re-set the SCG when setting the split bearer $B_{SP}$ that reuses the resource released by the resource control unit 140. Specifically, if the resource constituting the split bearer $B_{SP}$ of the predetermined layer and the layers below thereof (specifically, the RLC layer and the layers below thereof) in the SCG is only released, when setting the split bearer $B_{SP}$ that reuses the released resource, the connection control unit 120 resets the once released SCG.

More specifically, the connection control unit 120 sets the contents of the parameter included in the CellGroupConfig to the contents corresponding to the split bearer $B_{SP}$.

In addition, it is necessary that the eNB 100A (LTE MeNB) and the gNB 100B (NR SgNB) mutually recognize deletion of the setting of the SCG (that is, the SCG is not set). To achieve this, in a change procedure (MN initiated SN modification procedure) of the node included in the SCG, the connection control unit 120 of the LTE MeNB notifies the NR SgNB (other radio base station) to delete the setting itself of the SCG, if the bearer belonging to the SCG other than the split bearer $B_{SP}$ is not set.

Alternatively, the connection control unit 120 of the LTE MeNB can notify to the NR SgNB (other radio base station) to delete the setting itself of the SCG, in an addition procedure (SN addition procedure) of a node included in the SCG, when a bearer belonging to the SCG other than the split bearer $B_{SP}$ is not set.

The failure notification receiving unit 130 receives from the UE 200 a radio link failure (RLF) notification that notifies the radio link failure in the master cell group (MCG) and the secondary cell group (SCG). In particular, in the present embodiment, the failure notification receiving unit 130 receives from the UE 200 a failure notification (SCG Failure Information) that indicates that the RLF (hereinafter, "S-RLF") has occurred in the SCG.

The resource control unit 140 controls the resource in each layer of the protocol stack shown in FIG. 2. Specifically, the resource control unit 140 controls the resource required in each layer according to a setting state of the master cell group (MCG) and the secondary cell group (SCG).

In particular, in the present embodiment, the resource control unit 140 (that is, the gNB 100B in the present embodiment) releases, based on the resource change request (Secondary Node Modification Request) received from the eNB 100A, the resource constituting the split bearer $B_{SP}$ of the predetermined layer and the layers below thereof (specifically, the RLC layer and the layers below thereof) in the SCG.

That is, the resource control unit 140 releases only the $MAC_{NR}$ and the $RLC_{NR}$ among the $MAC_{NR}$, $RLC_{NR}$, $PDCP_{NR}$, and $SDAP_{NR}$ (see FIG. 2) that constitute the split bearer $B_{SP}$.

In addition, it is necessary that the eNB 100A (LTE MeNB) and the gNB 100B (NR SgNB) mutually recognize deletion of the setting of the SCG (that is, that the SCG is not set). To achieve this, in the change procedure (SN initiated SN modification procedure with MN involvement) of a node included in the SCG, the resource control unit 140 of the NR SgNB notifies the radio base station to delete the setting itself of the SCG, if the bearer belonging to the SCG other than the split bearer $B_{SP}$ is not set.

Alternatively, the resource control unit 140 of the NR SgNB can notify to the UE 200 to delete the setting itself of the SCG, in the change procedure (SN initiated SN modification procedure w/o MN involvement) of the node included in the SCG, if the bearer belonging to the SCG other than the split bearer $B_{SP}$ is not set.

(2.2) UE 200

Figure 4:
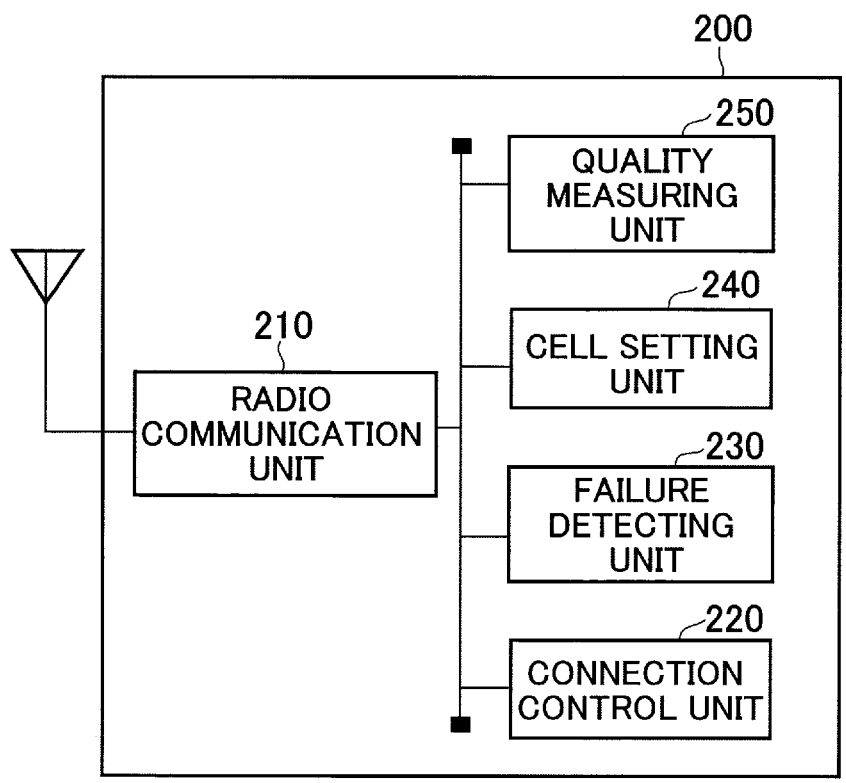
FIG. 4 is a functional block diagram of UE 200.

FIG. 4 is a functional block diagram of the UE 200. As shown in FIG. 4, the UE 200 includes a radio communication unit 210, a connection control unit 220, a failure detecting unit 230, a cell setting unit 240, and a quality measuring unit 250. The UE 200 provides the function of each layer in the protocol stack shown in FIG. 2 by the function blocks shown in FIG. 4. In FIG. 4, only the function blocks that relate to the present invention are shown.

The radio communication unit 210 performs radio communication according to the LTE system and the NR system. Specifically, the radio communication unit 210 transmits and receives radio signals to and from the eNB 100A according to the LTE system. The radio communication unit 210 transmits and receives radio signals to and from the gNB 100B according to the NR system. The radio signal is multiplexed with user data or control data.

The connection control unit 220 controls a connection between the UE 200 and the eNB 100A and a connection between the UE 200 and the gNB 100B. Specifically, the connection control unit 220 controls a connection in the RRC layer based on a connection message (RRC message) transmitted from the eNB 100A or the gNB 100B.

More specifically, the connection control unit 220 performs a connection change processing in the RRC layer based on the RRC Connection Reconfiguration received from the eNB 100A (or the gNB 100B). The connection control unit 220 transmits to the eNB 100A (or the gNB 100B) the RRC Connection Reconfiguration Complete that indicates that the connection change processing has been completed.

The failure detecting unit 230 detects the radio link failure (RLF) in the master cell group (MCG) and the secondary cell group (SCG). In particular, in the present embodiment, the failure detecting unit 230 detects the RLF in the SCG based on a detection condition of the RLF specified in the 3GPP Technical Standard (TS) (for example, TS 36.300 Chapter 10.1.6).

The cell setting unit 240 performs settings related to a cell of the master cell group (MCG) or a cell of the secondary cell group (SCG) to which the UE 200 can connect. Specifically, the cell setting unit 240 deactivates (deactivates) the SCG in a certain case.

More specifically, if the RRC message (RRC Connection Reconfiguration) received by the connection control unit 220 includes an information element that permits deactivation (deactivate), and if the radio link failure (RLF) in the SCG is detected, the cell setting unit 240 deactivates the setting of the cell (cell C2 in the present embodiment) included in the SCG.

In particular, in the present embodiment, even if the UE 200 is not autonomously allowed to deactivate the setting of the cell included in the SCG, if the information element is included in the received RRC Connection Reconfiguration and if the RLF in the SCG is detected, the cell setting unit 240 deactivates the setting of the cell included in the SCG.

If the information element that permits deletion of a cell quality measurement identifier in the SCG is included in the RRC message (RRC Connection Reconfiguration) received by the connection control unit 220, and if the radio link failure (RLF) in the SCG is detected, the cell setting unit 240 stops the quality measurement of the cell (cell C2 in the present embodiment) included in the SCG.

The quality measuring unit 250 measures the reception quality of the cells included in the master cell group (MCG) and the secondary cell group (SCG). Specifically, the quality measuring unit 250 measures Reference Signal Received Power (RSRP) and Reference Signal Received Quality (RSRQ) and the like in each of the cells, and transmits a measurement report (Measurement Report) when a predetermined condition (entering condition) is satisfied.

In particular, in the present embodiment, the quality measuring unit 250 measures, after partially releasing the resource (of the RLC layer and the layers below thereof) constituting the split bearer $B_{SP}$ in the gNB 100B (NR SgNB), the reception quality in the SCG at a cycle that is longer than that before releasing the resource.

(3) Operation of Radio Communication System

The operation of the radio communication system 10 will be explained below. Specifically, the operations related to setting and release of the split bearer (Split bearer via SCG) performed by the eNB 100A (LTE MeNB), the gNB 100B (NR SgNB), and the UE 200 will be explained.

(3.1) Operation in Case of Radio Link Failure

First, the operations performed in the case of the radio link failure (RLF) in the secondary cell group (SCG) will be explained by referring to FIGS. 5 to 8.

(3.1.1) Operation Example 1

Figure 5:
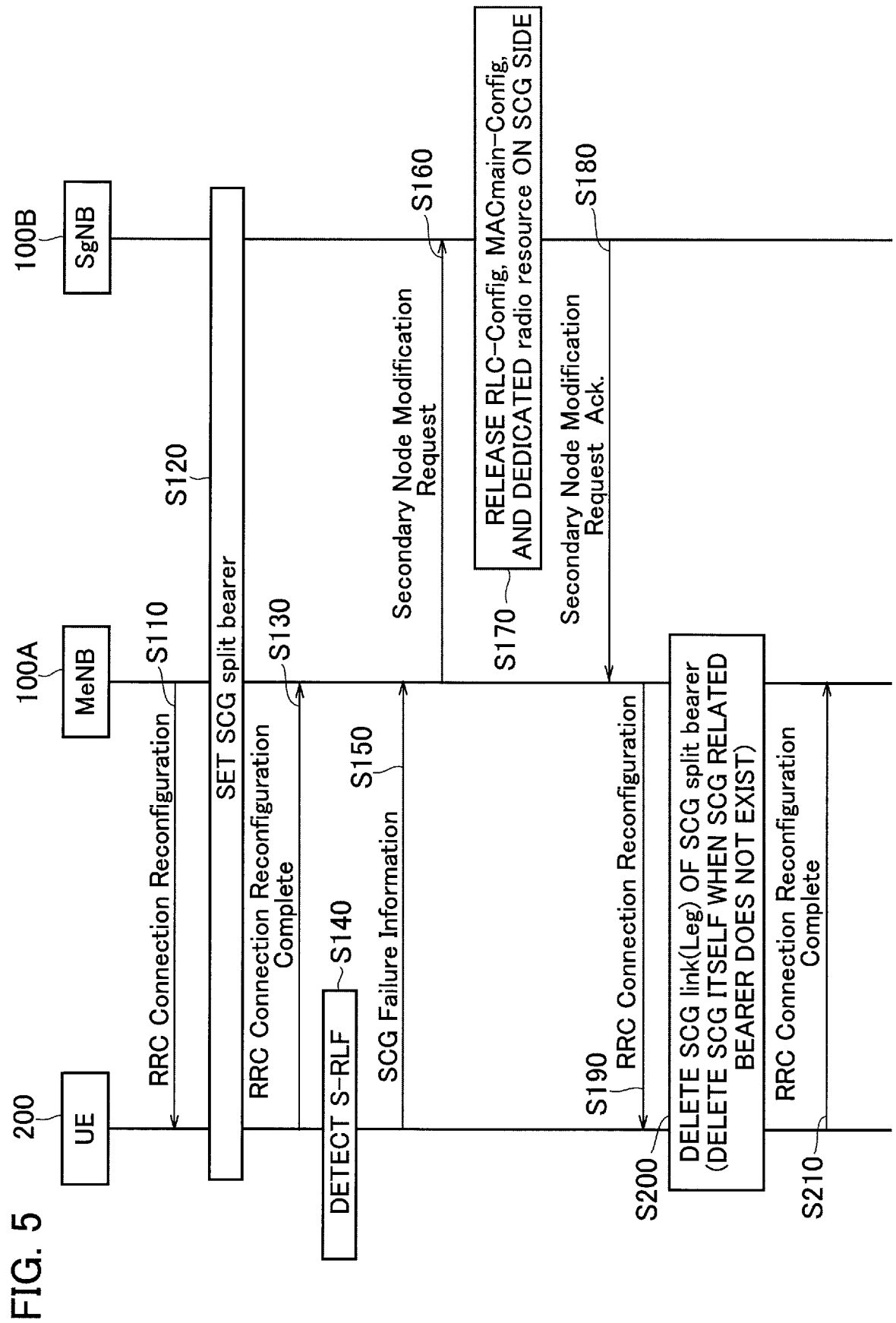
FIG. 5 is a diagram showing a control sequence (Operation Example 1) of a split bearer when a radio link failure occurs in a secondary cell group.

FIG. 5 shows a control sequence (Operation Example 1) of the split bearer when the radio link failure occurs in the secondary cell group.

FIG. 6 shows a configuration example of the split bearer $B_{SP}$ (Split bearer via SCG). As shown in FIG. 6, the split bearer $B_{SP}$ (thick line) is the Split bearer via SCG that branches from the $PDCP_{NR}$ of the gNB 100B to the eNB 100A. A thin line indicates a path of a settable bearer (not limited to split bearer) (see 3GPP TR38.804).

The split bearer $B_{SP}$ that branched to the eNB 100A provides a logical communication path to the UE 200 that passes via the $RLC_{LTE}$ and the $MAC_{LTE}$ of the eNB 100A. Also, the split bearer $B_{SP}$ provides a logical communication path to the UE 200 that passes via the $RLC_{NR}$ and the $MAC_{NR}$ of the gNB 100B. In this operation example, the SCG split bearer as shown in FIG. 6 is set.

As shown in FIG. 5, the eNB 100A transmits to the UE 200 the RRC Connection Reconfiguration that requests to set the split bearer $B_{SP}$ (SCG split bearer) (Step S110). As explained above, the split bearer $B_{SP}$ is called as the Split bearer via SCG; however, it will be shown as "SCG split bearer" for the sake of convenience.

The UE 200 sets the split bearer $B_{SP}$ based on the received RRC Connection Reconfiguration and transmits the RRC Connection Reconfiguration Complete to the eNB 100A (Steps S120 and S130).

Next, the UE 200 detects the RLF (S-RLF) in the SCG and transmits to the eNB 100A the failure notification (SCG Failure Information) that indicates that the S-RLF has occurred (Steps S140 and S150).

The eNB 100A transmits the Secondary Node Modification Request (resource change request) to the gNB 100B based on the received SCG Failure Information (Step S160).

Based on the received Secondary Node Modification Request, the gNB 100B releases RLC-Config, MACmain-Config, and the dedicated radio resource (radio resource) on the SCG side. Specifically, the gNB 100B releases the resource related to the split bearer $B_{SP}$ of the $RLC_{NR}$, the $MAC_{NR}$, and the physical layer (Step S170).

The gNB 100B transmits, to the eNB 100A, Secondary Node Modification Request Acknowledgement that indicates that the resource has been released (Step S180).

Based on the received Secondary Node Modification Request Acknowledgement, the eNB 100A transmits to the UE 200 the RRC Connection Reconfiguration that requests to change the setting of the split bearer $B_{SP}$ (Step S190).

Based on the received RRC Connection Reconfiguration, the UE 200 deletes SCG link (Leg) constituting the split bearer $B_{SP}$ (SCG split bearer) (Step S200). Specifically, the UE 200 releases the RLC-Config, the MACmain-Config, and the dedicated radio resource (radio resource) of the SCG side constituting the split bearer $B_{SP}$, that is, the resource related to the split bearer $B_{SP}$ of the $RLC_{NR}$, the $MAC_{NR}$, and the physical layer.

Furthermore, the eNB 100A deletes the SCG itself, specifically, deletes the configuration of the SCG, if the bearer (SCG related bearer) belonging to the SCG other than the split bearer $B_{SP}$ is not set. Note that, as the bearer belonging to the SCG, as mentioned above, the SCG bearer, the SCG split bearer, or the MCG split bearer can be mentioned.

In this way, by completely deleting (releasing) the SCG, the frequency of the measurement report (Measurement Report) related to the SCG that the UE 200 must perform is further reduced.

The UE 200 transmits to the eNB 100A the RRC Connection Reconfiguration Complete that indicates that the SCG link (Leg) has been deleted (Step S210).

Figure 7:
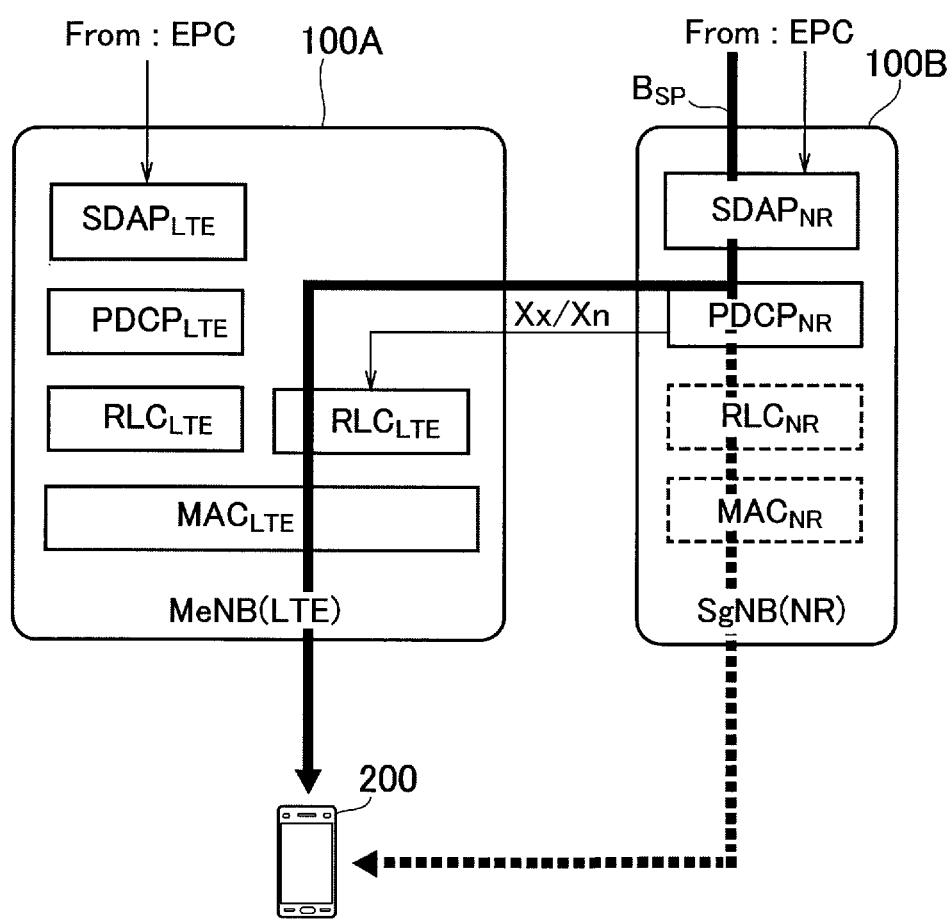
FIG. 7 is a diagram showing a configuration example (after partial release of the resource) of the split bearer $B_{SP}$ (Split bearer via SCG).

FIG. 7 shows an example of a configuration of the split bearer $B_{SP}$ (Split bearer via SCG) (after partial release of the resource). As shown in FIG. 7, because the resource of the $RLC_{NR}$ layer and the layers below thereof of the gNB 100B is released, (the resource that constitutes) the split bearer $B_{SP}$ is released in a route (a route shown with a dotted line in FIG. 7) that goes directly from the gNB 100B to the UE 200.

In this manner, when the S-RLF is detected, the split bearer $B_{SP}$ is partially released. Accordingly, the UE 200 performs the measurement reporting (Measurement Report) at a cycle that is longer than that when the SCG is active. As a result, the power consumption of the UE 200 is reduced. Also, because the setting itself of the split bearer $B_{SP}$ on the MCG side is maintained, signaling caused by repeated release and setting of the split bearer can be suppressed.

(3.1.2) Operation Example 2

Figure 8:
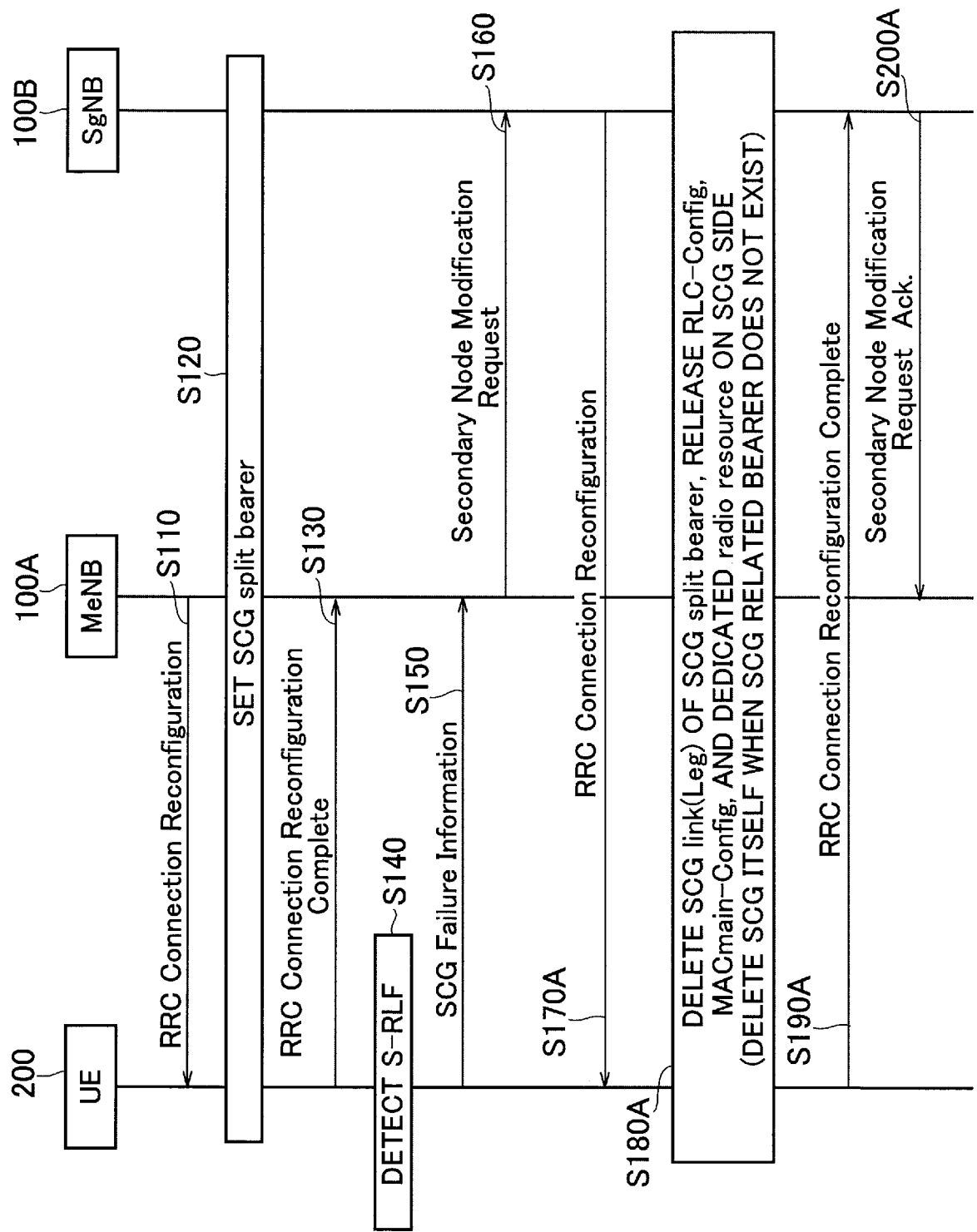
FIG. 8 is a diagram showing a control sequence (Operation Example 2) of the split bearer when a radio link failure occurs in the secondary cell group.

FIG. 8 shows a control sequence (Operation Example 2) of the split bearer when a radio link failure occurs in the secondary cell group. Mainly the operations that are different from Operation Example 1 will be explained below.

In Operation Example 1 the eNB 100A (LTE MeNB) transmitted the RRC message; however, in this operation example the gNB 100B (NR SgNB) transmits the RRC message. Steps S110 to S160 shown in FIG. 8 are the same as Steps S110 to S160 of FIG. 5.

The gNB 100B transmits to the UE 200 the RRC Connection Reconfiguration based on the received Secondary Node Modification Request (Step S170A). The RRC Connection Reconfiguration instructs to delete the SCG link (Leg) constituting the split bearer $B_{SP}$ (SCG split bearer) and to release the RLC-Config, the MACmain-Config, and the dedicated radio resource (radio resource) on the SCG side.

The gNB 100B and the UE 200 perform deletion of the SCG link (Leg) and release of the resource (Step S180A).

Furthermore, when the bearer (SCG related bearer) belonging to the SCG other than the split bearer $B_{SP}$ is not set, the eNB 100A and the gNB 100B delete the SCG itself. Specifically, each of the eNB 100A and the gNB 100B deletes the configuration of the SCG, or deletes information such as parameters and identifiers of the physical layer and the MAC layer of all the cells included in the SCG.

The UE 200 transmits to the gNB 100B the RRC Connection Reconfiguration Complete that indicates that deletion of the SCG link (Leg) and release of the resource was performed (Step S190A).

Based on the received RRC Connection Reconfiguration Complete, the gNB 100B transmits to the eNB 100A the Secondary Node Modification Request Acknowledgement that indicates that the resource has been released (Step S200A).

Even with this operation example, although the device that transmits the RRC message is different, the same effect as Operation Example 1 can be obtained.

(3.2) Notification to Delete Secondary Cell Group

When the bearer (SCG related bearer) belonging to the SCG other than the split bearer $B_{SP}$ is not set, because the eNB 100A and the gNB 100B (or the gNB 100B and the UE 200) must share the information regarding to delete the SCG itself (not to set the SCG itself), an operation to notify about the deletion is explained below.

Two notification methods will be described below. In the first notification method, information for setting the solid line part of the split bearer $B_{SP}$ shown in FIG. 7 (which is a bearer extended from the secondary node (SN) belonging to the SCG and below referred to as "SN anchored bearer" for the sake of convenience) and an information element (SCG Release) that indicates that the SCG is not set (SCG Configuration) are exchanged between the eNB 100A and the gNB 100B (or between the gNB 100B and the UE 200).

In the second notification method, as the setting information (radioBearerConfig) of the radio bearer, information that the bearer set that passes via the gNB 100B (SN) is not included other than the SN anchored bearer and the SCG is not set implicitly is notified and shared between the eNB 100A and the gNB 100B.

A specific example of the operation will be explained below. The following operation example is in accordance with the SN related procedure described in 3GPP TS 37.340.

(3.2.1) Operation Example 1

Figure 9:
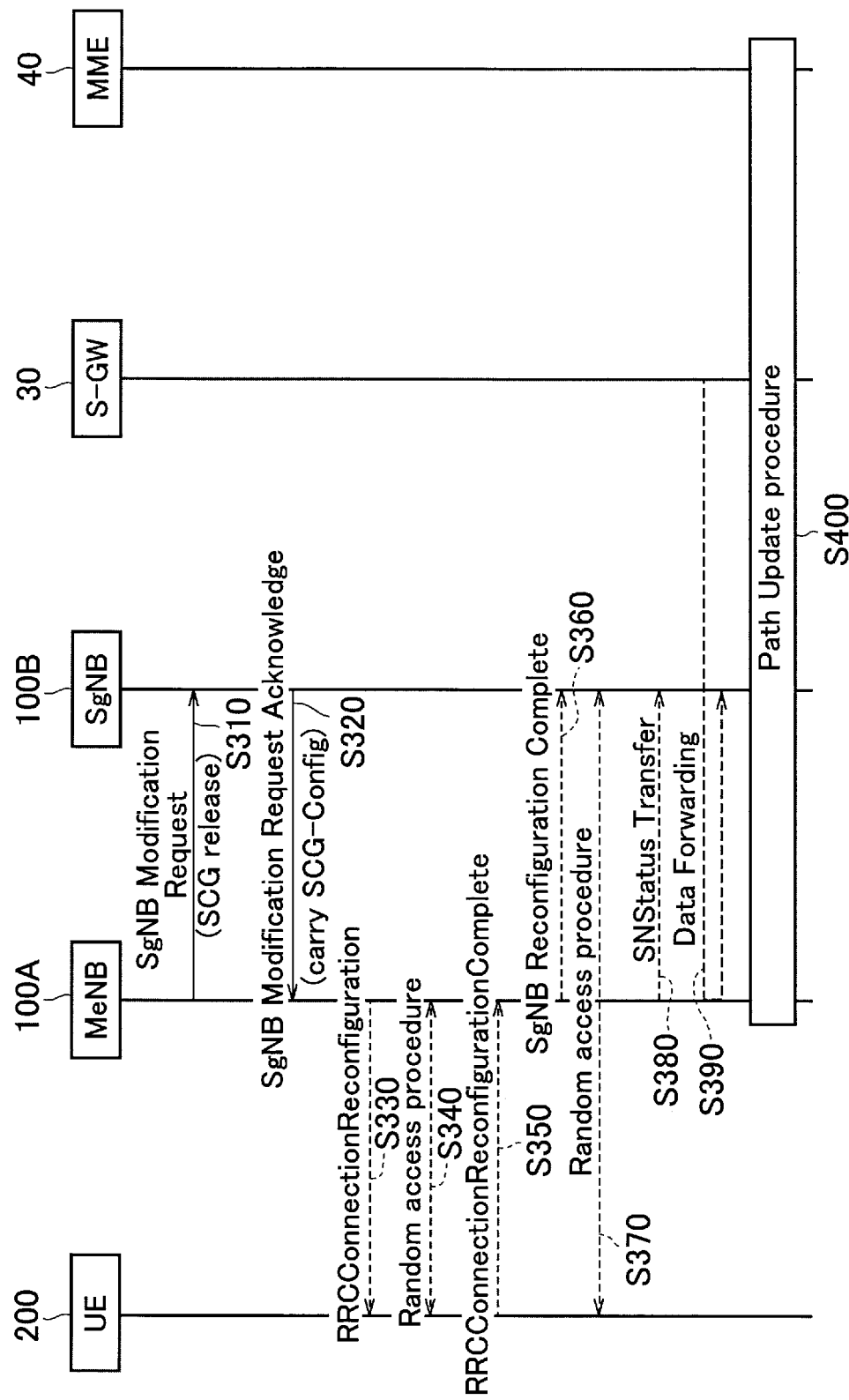
FIG. 9 is a diagram showing SN related procedure (Operation Example 1) used for notifying deletion of SCG itself when a bearer (SCG related bearer) belonging to the SCG other than the split bearer $B_{SP}$ is not set.

FIG. 9 shows the SN related procedure (Operation Example 1) used for notifying deletion of the SCG itself when a bearer (SCG related bearer) belonging to the SCG other than the split bearer $B_{SP}$ is not set.

Specifically, FIG. 9 shows the MN initiated SN modification procedure specified in TS 37.340. As shown in FIG. 9, in the MN initiated SN modification procedure, the eNB 100A (LTE MeNB/MN) takes lead and performs the setting change of the gNB 100B (NR SgNB/SN) with the gNB 100B (Steps S310 and S320).

The eNB 100A includes in SgNB Modification Request the SCG Release to indicate that the SCG is not to be set (SCG Configuration). As a result, the gNB 100B recognizes that the SCG itself is deleted (the SCG itself is not set) when the bearer (SCG related bearer) belonging to the SCG other than the split bearer $B_{SP}$ is not set.

Thereafter, the procedure according to the MN initiated SN modification procedure is performed (Steps S330 to S400).

(3.2.2) Operation Example 2

Figure 10:
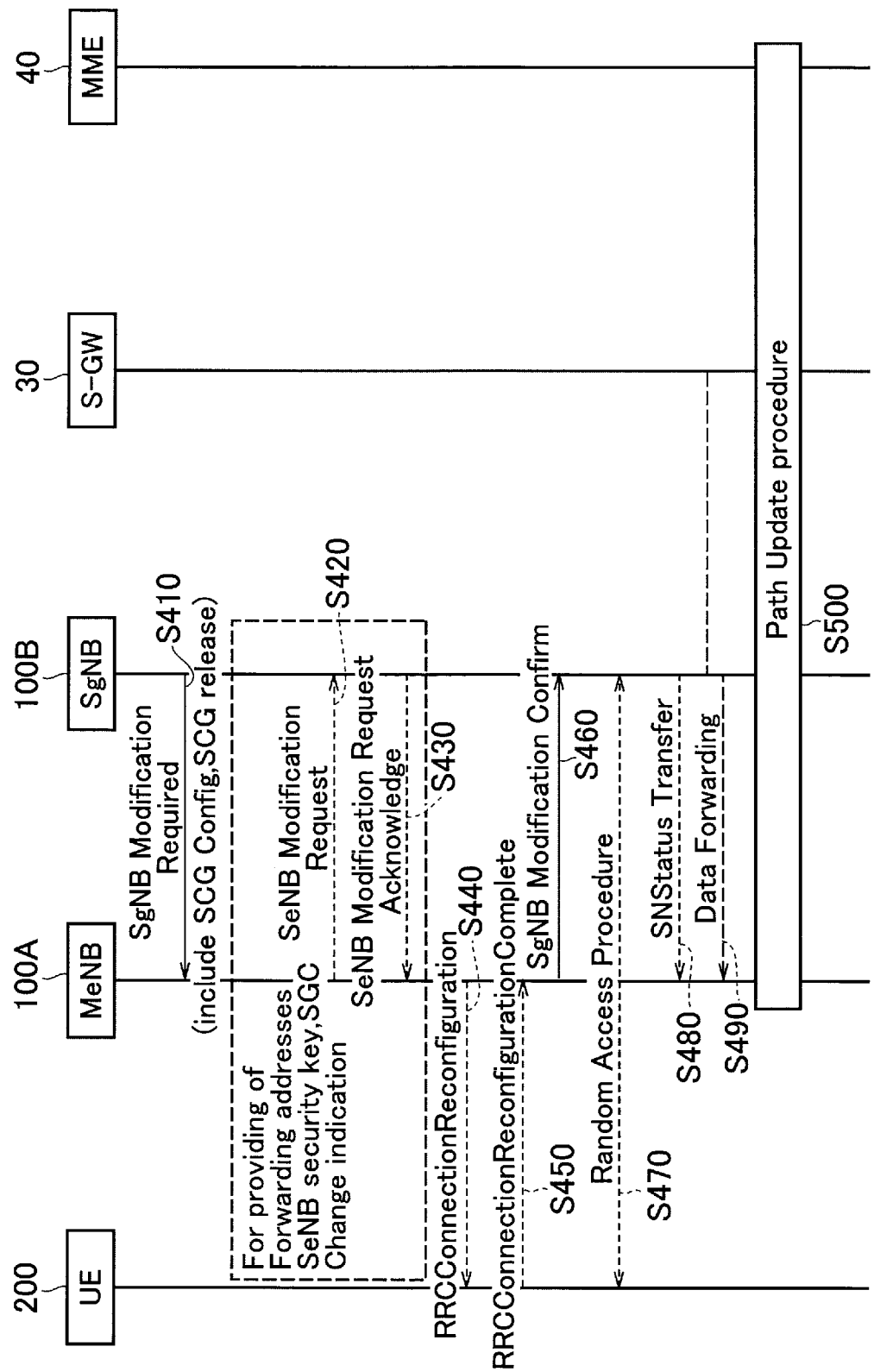
FIG. 10 is a diagram showing SN related procedure (Operation Example 2) used for notifying deletion of the SCG itself when the bearer (SCG related bearer) belonging to the SCG other than the split bearer $B_{SP}$ is not set.

FIG. 10 shows the SN related procedure (Operation Example 2) used for notifying deletion of the SCG itself when a bearer (SCG related bearer) belonging to the SCG other than the split bearer $B_{SP}$ is not set.

Specifically, FIG. 10 shows the SN initiated SN modification procedure with MN involvement specified in TS 37.340. As shown in FIG. 10, in the SN initiated SN modification procedure with MN involvement, the gNB 100B (NR SgNB/SN) takes the lead and performs the setting change of the NR SgNB/SN with the eNB 100A (Steps S410 to S430).

The gNB 100B includes in SgNB Modification Required the SCG Release to indicate that the SCG is not set (SCG Configuration). As a result, the eNB 100A recognizes that the SCG itself is to be deleted (the SCG itself is not to be set) when the bearer (SCG related bearer) belonging to the SCG other than the split bearer $B_{SP}$ is not set.

Thereafter, the procedure according to the SN initiated SN modification procedure with MN involvement is performed (Steps S440 to S500).

(3.2.3) Operation Example 3

Figure 11:
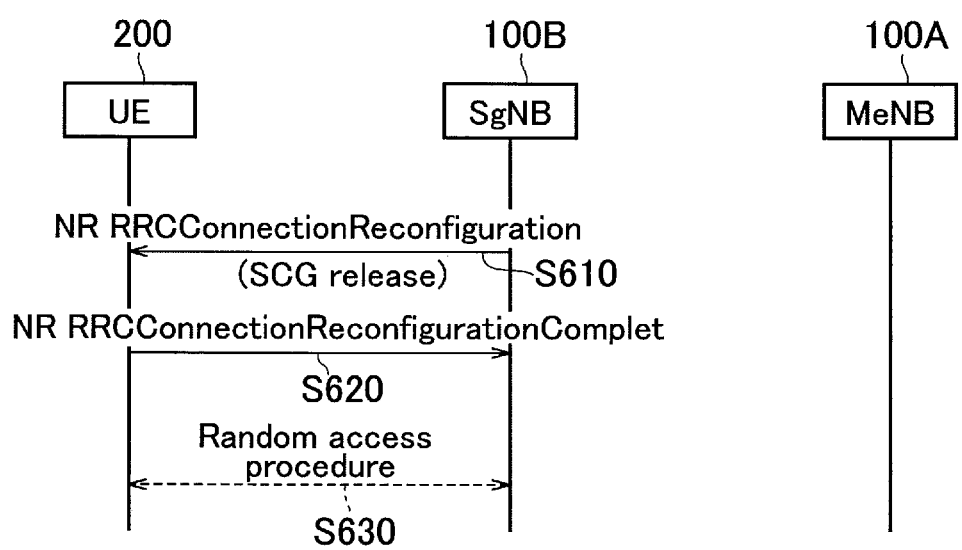
FIG. 11 is a diagram showing SN related procedure (Operation Example 3) used for notifying deletion of the SCG itself when the bearer (SCG related bearer) belonging to the SCG other than the split bearer $B_{SP}$ is not set.

FIG. 11 shows the SN related procedure (Operation Example 3) used for notifying deletion of the SCG itself when a bearer (SCG related bearer) belonging to the SCG other than the split bearer $B_{SP}$ is not set.

Specifically, FIG. 11 shows the SN initiated SN modification procedure w/o MN involvement defined in TS 37.340. As shown in FIG. 11, in the SN initiated SN modification procedure w/o MN involvement, the gNB 100B (NR SgNB/SN) performs the setting change of the NR SgNB/SN with the UE 200 without involving the eNB 100A (Steps S610 and S620).

The gNB 100B includes in NR RRC Connection Reconfiguration the SCG Release to indicate that the SCG is not set (SCG Configuration). In other words, the gNB 100B directly instructs the UE 200 to delete the SCG itself when the bearer (SCG related bearer) belonging to the SCG other than the split bearer $B_{SP}$ is not set.

Thus, the UE 200 recognizes that the SCG itself is to be deleted (not to set the SCG itself) when a bearer (SCG related bearer) belonging to the SCG other than the split bearer $B_{SP}$ is not set.

Thereafter, the procedure according to the SN initiated SN modification procedure w/o MN involvement is performed (Step S630).

(3.2.4) Operation Example 4

Figure 12:
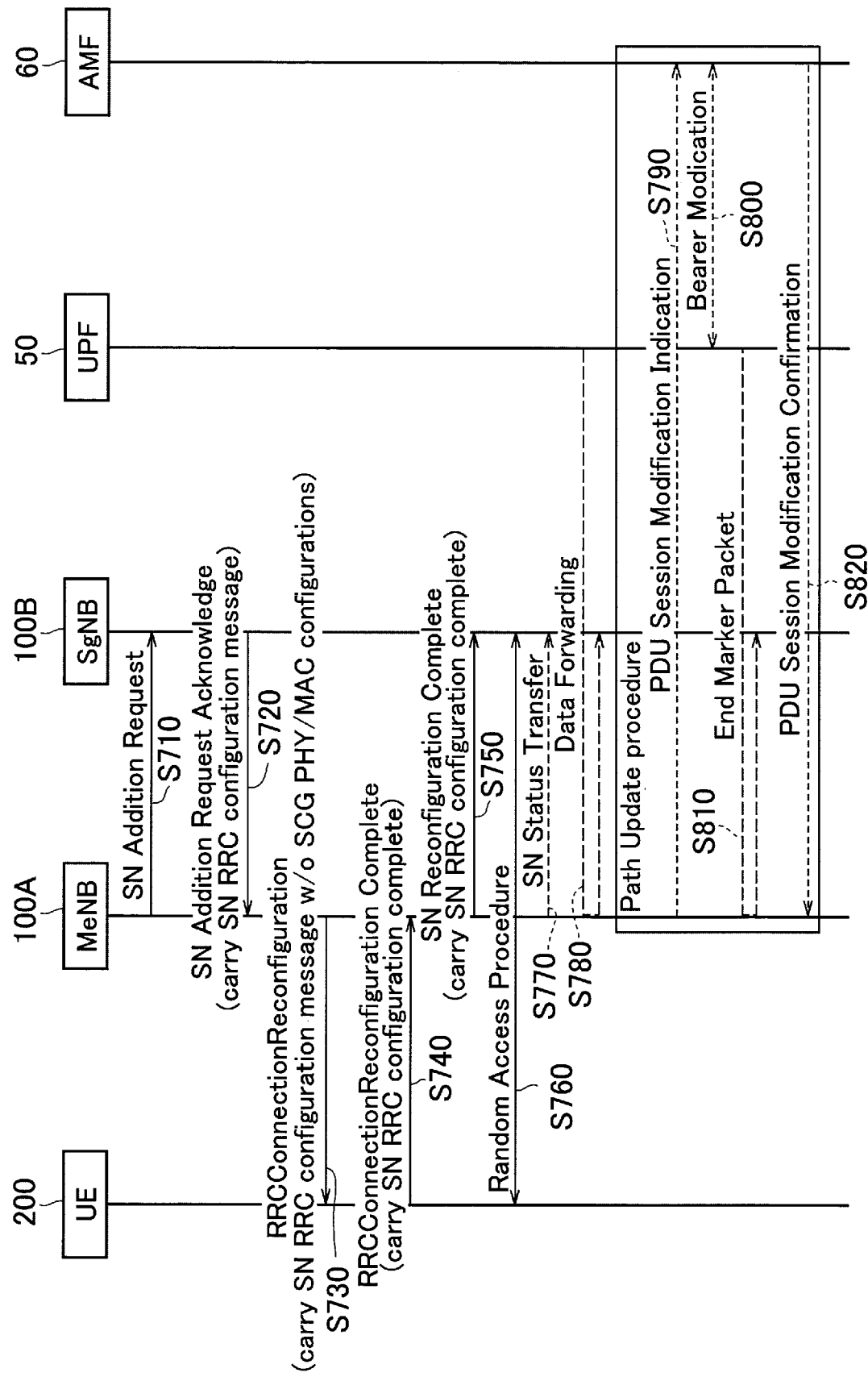
FIG. 12 is a diagram showing SN related procedure (Operation Example 4) used for notifying deletion of the SCG itself when the bearer (SCG related bearer) belonging to the SCG other than the split bearer $B_{SP}$ is not set.

FIG. 12 shows the SN related procedure (Operation Example 4) used for notifying deletion of the SCG itself when a bearer (SCG related bearer) belonging to the SCG other than the split bearer $B_{SP}$ is not set.

Specifically, FIG. 12 shows the SN addition procedure defined in TS 37.340. As shown in FIG. 12, in the SN addition procedure, by using SN Addition Request, the eNB 100A (LTE MeNB/MN) notifies the gNB 100B to set only the SN anchored bearer (Step S710).

The gNB 100B transmits to the UE 200 the RRC Connection Reconfiguration (SN RRC configuration message w/o SCG PHY/MAC configurations) that does not include the physical (PHY)/MAC layer setting of the SCG (Step S730).

Thereafter, the procedure according to the SN addition procedure is performed (Steps S740 to S820).

(3.3) Setting Split Bearer after Releasing Split Bearer

Next, the operation related to the setting of the split bearer $B_{SP}$ after partial release of the resource on the SCG (split bearer $B_{SP}$) side by the operation when the radio link failure (RLF) occurs in the secondary cell group (SCG) (Operation Examples 1 and 2) will be explained.

In this example, it is assumed that the SCG itself is deleted because the bearer (SCG related bearer) belonging to the SCG other than the split bearer $B_{SP}$ is not set.

(3.3.1) Operation Example 1

Figure 13:
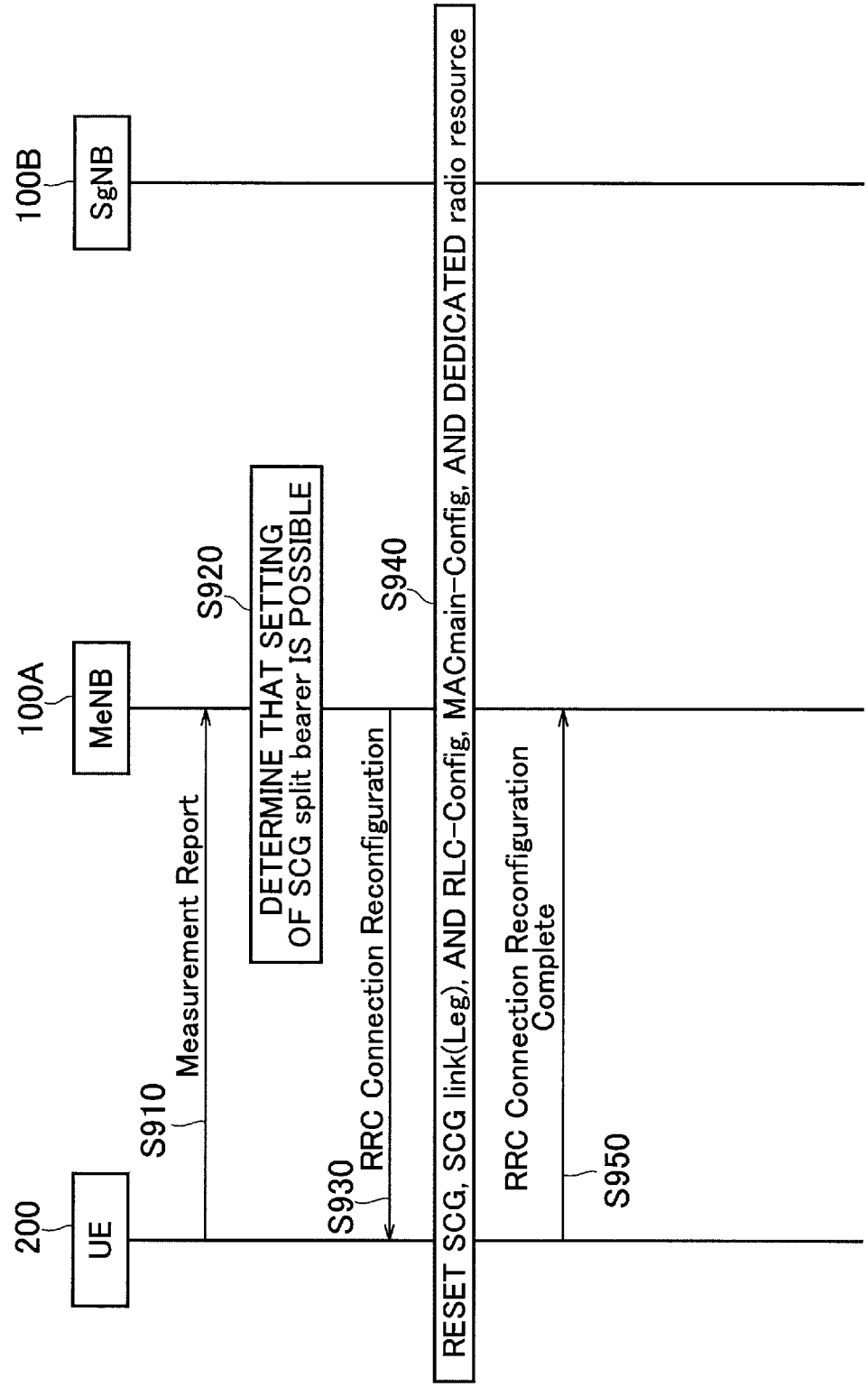
FIG. 13 is a diagram showing a setting sequence (Operation Example 1) of the split bearer $B_{SP}$ after partial release of the resource on the SCG (split bearer $B_{SP}$) side.

FIG. 13 shows a setting sequence (Operation Example 1) of the split bearer $B_{SP}$ after partial release of the resource on the SCG (split bearer $B_{SP}$) side. In Operation Example 1, the eNB 100A (LTE MeNB) controls the setting of the split bearer $B_{SP}$.

As shown in FIG. 13, the UE 200 periodically transmits the measurement report (Measurement Report) to the eNB 100A after partially releasing the resource on the SCG (split bearer $B_{SP}$) side (Step S910).

Based on the received measurement report, the eNB 100A determines whether the split bearer in the SCG, specifically, the split bearer $B_{SP}$ (see FIG. 6) can be set (Step S920).

In this example, it is assumed that the reception quality of the cell included in the measurement report satisfies a predetermined condition and it is determined that the split bearer $B_{SP}$ can be set.

Note that, depending on the location or the like of the UE 200, it may be determined that the split bearer $B_{SP}$ can be set in the same SCG (specifically, the NR SgNB) as before the partial release of the resource on the SCG side, or, it may be determined that the split bearer $B_{SP}$ can be set in the SCG that is different from that before the partial release of the resource on the SCG side.

The eNB 100A transmits to the UE 200 the RRC Connection Reconfiguration that requests to set the split bearer $B_{SP}$ (Step S930).

Based on the received RRC Connection Reconfiguration, the UE 200 resets the SCG link (Leg) constituting the split bearer $B_{SP}$ (SCG split bearer) and the RLC-Config, the MACmain-Config, and the dedicated radio resource on the SCG side (Step S940).

Furthermore, each of the UE 200, the eNB 100A, and the gNB 100B resets the SCG link (Leg) or the like based on the received RRC Connection Reconfiguration and also resets the SCG deleted by the above operation.

If the split bearer $B_{SP}$ is set in the same SCG, the split bearer $B_{SP}$ is reset. Specifically, only the SCG link (Leg) deleted by the above operation example and the released RLC-Config, the MACmain-Config, and the dedicated radio resource (radio resource) on the SCG side are reset. That is, the other resource ($PDCP_{NR}$, $RLC_{LTE}$, and the like) constituting the split bearer $B_{SP}$ are used as they are maintained.

On the other hand, when the split bearer $B_{SP}$ is set in the SCG that is different from that before the partial release of the resource on the SCG side, a new SCG split bearer is set. In this case, the maintained resource of the split bearer $B_{SP}$ is released.

The UE 200 transmits to the eNB 100A the RRC Connection Reconfiguration Complete that indicates that the SCG link (Leg) and the resource have been reset, or that the new SCG split bearer has been set (Step S950).

According to this operation example, when it is determined that the split bearer $B_{SP}$ can be set in the same SCG as before the partial release of the resource on the SCG side, the split bearer $B_{SP}$ is reset by using the maintained split bearer $B_{SP}$ resource. Therefore, it is possible to reduce the signaling amount while efficiently using the resource.

(3.3.2) Operation Example 2

Figure 14:
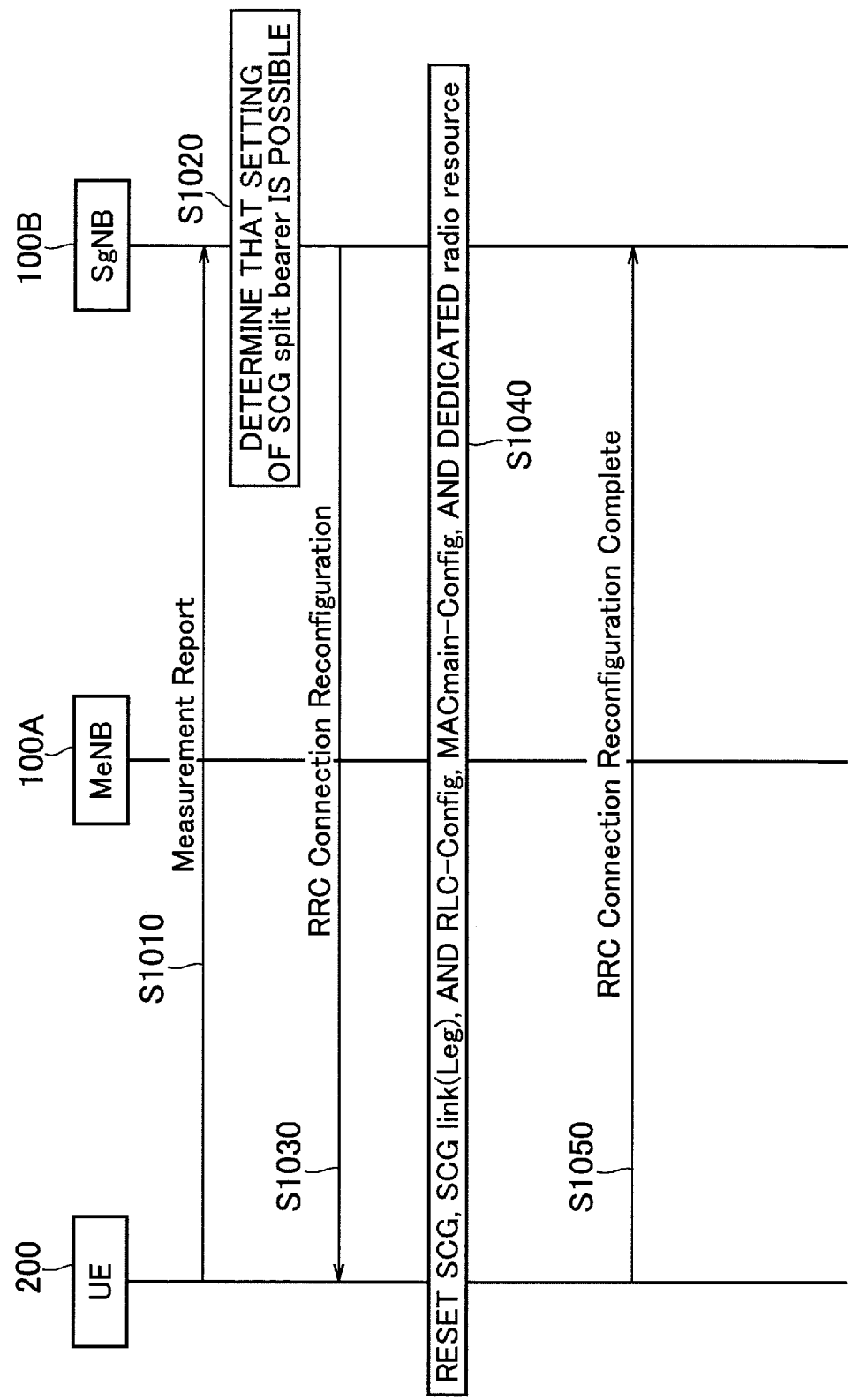
FIG. 14 is a diagram showing a setting sequence (Operation Example 2) of the split bearer $B_{SP}$ after partial release of the resource on the SCG (split bearer $B_{SP}$) side.

FIG. 14 shows a setting sequence (Operation Example 2) of the split bearer $B_{SP}$ after partial release of the resource on the SCG (split bearer $B_{SP}$) side. In Operation Example 2, the gNB 100B (NR SgNB) controls the setting of the split bearer $B_{SP}$.

The differences between the present operation example and the above-explained Operation Example 6 will be mainly explained below. The difference between Operation Example 6 and Operation Example 7 is that the device that controls is the gNB 100B instead of the eNB 100A, and the processing content of each step is the same as Operation Example 1.

Specifically, Steps S910 to S950 in FIG. 13 correspond to Steps S1010 to S1050 in FIG. 14, respectively.

Also, in Operation Example 2, each of the UE 200, the eNB 100A, and the gNB 100B resets the SCG link (Leg) and the like based on the received RRC Connection Reconfiguration and resets the SCG deleted by the above operation.

(4) Advantageous Effects

The following advantageous effects can be achieved with the above-explained embodiments. In particular, for example, when the eNB 100A receives from the UE 200 the SCG Failure Information (failure notification) that indicates that the radio link failure (S-RLF) has occurred in the SCG, it is possible to transmit to the gNB 100B the Secondary Node Modification Request (resource change request) to instruct to release only the resource constituting the split bearer $B_{SP}$ of the RLC layer and the layers below thereof in the SCG.

Based on the received Secondary Node Modification Request, the gNB 100B releases the resource constituting the split bearer $B_{SP}$ of the RLC layer and the layers below thereof in the SCG.

Therefore, when resetting the split bearer $B_{SP}$, the maintained resource of the layers above the PDCP layer are used as they are, so that it is possible to reduce the signaling amount associated with the release and setting of the split bearer $B_{SP}$.

In addition, the eNB 100A (the gNB 100B and the UE 200) deletes the setting itself of the SCG when the bearer belonging to the SCG other than the split bearer $B_{SP}$ is not set.

Therefore, the SCG is completely deleted (released), and the frequency of the measurement report (Measurement Report) on the SCG that the UE 200 has to perform is further reduced. Note that, unlike the deactivation (deactivate) of the SCG, the deletion of the setting itself of the SCG involves the deletion (release) of the configuration of the SCG, therefore, further reduction of the frequency of the Measurement Report is expected as compared to the SCG deactivation. Accordingly, reduction of the power consumption of the UE 200 can be effectively achieved.

That is, with the radio communication system 10, when setting the split bearer $B_{SP}$ that passes via the SCG, the suppression of the increase in the signaling amount due to the repeated release and setting of the split bearer $B_{SP}$ and the reduction of the power consumption can be achieved at the same time.

In the present embodiment, for example, the eNB 100A can reset the once deleted SCG when setting the split bearer $B_{SP}$ that reuses the released resource.

Therefore, it is possible to reset the SCG quickly and efficiently while reducing the signaling amount associated with the resetting of the split bearer $B_{SP}$.

In the present embodiment, the eNB 100A can delete the setting itself of the SCG in the MN initiated SN modification procedure (see FIG. 9). Also, the eNB 100A can delete the setting itself of the SCG in the SN addition procedure.

Furthermore, the gNB 100B can delete the setting itself of the SCG in the SN initiated SN modification procedure with MN involvement or in the SN initiated SN modification procedure with MN involvement.

Therefore, it is possible to efficiently delete the setting itself of the SCG while using the existing related procedure prescribed in 3GPP TS 37.340.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, in the above embodiment, the eNB 100A is a radio base station (eNB) of the LTE system and constitutes a master base station, the gNB 100B is a radio base station (gNB) of the NR system and constitutes a secondary base station; however, this configuration can be reversed. That is, the radio base station (gNB) of the NR system can constitute the master base station and the radio base station (eNB) of the LTE system can constitute the secondary base station.

Moreover, the block diagrams used for explaining the embodiments (FIGS. 3 and 4) show functional block diagrams. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 15:
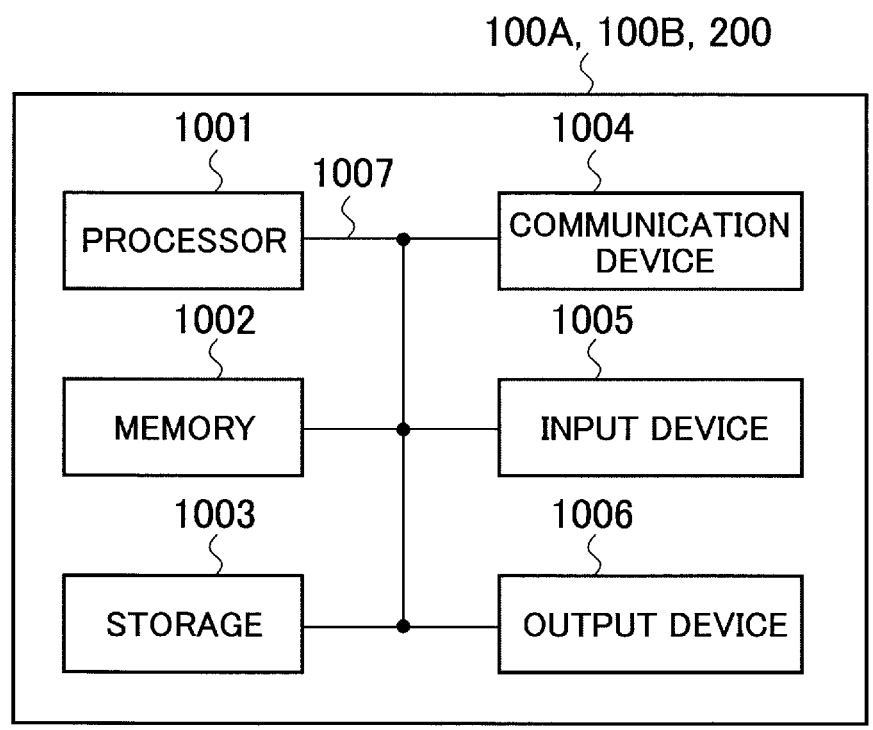
FIG. 15 is a diagram showing an example of hardware configuration of the eNB 100A, the gNB 100B, and the UE 200.

Furthermore, the eNB 100A, the gNB 100B, and the UE 200 (devices) explained above can function as a computer that performs the transmission power control processing of the present invention. FIG. 15 is a diagram showing an example of a hardware configuration of these devices. As shown in FIG. 15, each of these devices can be configured as a computer device including a processor 1001, a memory 1002, a storage 1003, a communication device 1004, an input device 1005, an output device 1006, a bus 1007, and the like.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray® disk), a smart card, a flash memory (for example, a card, a stick, a key drive), a Floppy® disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called RRC message, and the RRC signaling can be, for example, RRC Connection Setup message, RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB 100B, same holds true in the below explanation) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

As explained above, when setting the split bearer that passes via the secondary cell group (SCG), the present invention is useful in achieving both the suppression of the increase in the signaling amount due to repeated release and setting of the split bearer and reduction of the power consumption of the user equipment.

EXPLANATION OF REFERENCE NUMERALS 10 radio communication system
20 core network
30 S-GW
40 MME
50 UPF
60 AMF
100A eNB
100B gNB
110 radio communication unit
120 connection control unit
130 failure notification receiving unit
140 resource control unit
200 UE
210 radio communication unit
220 connection control unit
230 failure detecting unit
240 cell setting unit
250 quality measuring unit
1001 processor
1002 memory
1003 storage
1004 communication device
1005 input device
1006 output device
1007 bus

The invention claimed is:

1. A base station, comprising:
a receiver that receives from a terminal a failure notification that indicates that a radio link failure has occurred in a secondary cell group for a split bearer between the base station included in a master cell group and an other base station included in the secondary cell group; and
a processor that, when the receiver has received the failure notification, transmits to the other base station a resource change request to instruct to release a resource of the split bearer of a predetermined layer and layers below thereof in the secondary cell group, wherein
the processor deletes setting itself of the secondary cell group when a bearer belonging to the secondary cell group other than the split bearer is not set.

2. The base station as claimed in claim 1, wherein the split bearer passes from a core network to the secondary cell group and branches from the other base station to the base station, and data is transmitted to the terminal via the split bearer.

3. The base station as claimed in claim 1, wherein the processor resets the secondary cell group when the split bearer that reuses the resource released by the processor is set.

4. The base station as claimed in claim 1, wherein, in a change procedure of a node included in the secondary cell group, when the bearer belonging to the secondary cell group other than the split bearer is not set, the processor notifies the other base station to delete the setting itself of the secondary cell group.

5. The base station as claimed in claim 1, wherein, in an addition procedure of a node included in the secondary cell group, when the bearer belonging to the secondary cell group other than the split bearer is not set, the processor notifies the other base station to delete the setting itself of the secondary cell group.

6. A communication method, comprising:
receiving from a terminal a failure notification that indicates that a radio link failure has occurred in a secondary cell group for a split bearer between a base station included in a master cell group and an other base station included in the secondary cell group; and
transmitting to the other base station a resource change request to instruct to release a resource of the split bearer of a predetermined layer and layers below thereof in the secondary cell group when the failure notification is received,
wherein the base station deletes setting itself of the secondary cell group when a bearer belonging to the secondary cell group other than the split bearer is not set.

7. A communication system including a base station and an other base station, wherein
the base station includes:
a receiver that receives from a terminal a failure notification that indicates that a radio link failure has occurred in a secondary cell group for a split bearer between the base station included in a master cell group and the other base station included in the secondary cell group; and
a processor that, when the receiver has received the failure notification, transmits to the other base station a resource change request to instruct to release a resource of the split bearer of a predetermined layer and layers below thereof in the secondary cell group; and
the other base station includes:
a processor that releases the resource of the split bearer of the predetermined layer and the layers below thereof in the secondary cell group based on the received resource change request, and the processor deletes setting itself of the secondary cell group when a bearer belonging to the secondary cell group other than the split bearer is not set.

* * * * *